(12) United States Patent
Saitou

(10) Patent No.: US 9,493,684 B2
(45) Date of Patent: Nov. 15, 2016

(54) POLARIZER PROTECTIVE FILM, POLARIZING PLATE, AND IMAGE DISPLAY APPARATUS

(75) Inventor: Takeshi Saitou, Osaka (JP)

(73) Assignees: NITTO DENKO CORPORATION, Ibaraki-shi (JP); NIPPON SHOKUBAI CO., LTD., Osaka-shi (JP)

(*) Notice: Subject to any disclaimer, the term of this patent is extended or adjusted under 35 U.S.C. 154(b) by 467 days.

(21) Appl. No.: 12/811,938

(22) PCT Filed: Nov. 28, 2008

(86) PCT No.: PCT/JP2008/071661
§ 371 (c)(1),
(2), (4) Date: Jul. 7, 2010

(87) PCT Pub. No.: WO2009/096090
PCT Pub. Date: Aug. 6, 2009

(65) Prior Publication Data
US 2010/0284072 A1    Nov. 11, 2010

(30) Foreign Application Priority Data
Jan. 31, 2008   (JP) ................................ 2008-021269

(51) Int. Cl.
*C09J 133/06* (2006.01)
*G02B 1/04* (2006.01)
(Continued)

(52) U.S. Cl.
CPC .............. *C09J 133/06* (2013.01); *B32B 27/30* (2013.01); *C08L 33/08* (2013.01); *C09J 7/0217* (2013.01);
(Continued)

(58) Field of Classification Search
CPC ................................................. C09J 2433/033
See application file for complete search history.

(56) References Cited

U.S. PATENT DOCUMENTS 7,659,006 B2 * 2/2010 Yano et al. .................... 428/480
8,139,181 B2    3/2012 Yoshihara et al.
(Continued)

FOREIGN PATENT DOCUMENTS

CN    1854766 A    11/2006
EP    1933181 A1    6/2008
(Continued)

OTHER PUBLICATIONS

Machine transition of JP 2007041563 A (2007).*
(Continued)

*Primary Examiner* — Frank D Ducheneaux
(74) *Attorney, Agent, or Firm* — Westerman, Hattori, Daniels & Adrian, LLP

(57) ABSTRACT

The present invention provides a polarizer protective film excellent in optical properties (retardation and haze) and excellent in the adhesion property between a polarizer and a polarizer protective film (in particular, under high temperature and high humidity conditions). The polarizer protective film of the present invention includes a (meth)acrylic resin film and an easy-adhesion layer disposed on at least one side of the film. The easy-adhesion layer is formed from an aqueous (meth)acrylic resin dispersion.

6 Claims, 1 Drawing Sheet

(51) Int. Cl.
  *B32B 27/30* (2006.01)
  *C08L 33/08* (2006.01)
  *C09J 7/02* (2006.01)
  *G02B 1/10* (2015.01)
  *G02B 5/30* (2006.01)
  *G02F 1/1335* (2006.01)

(52) U.S. Cl.
  CPC .............. *G02B 1/04* (2013.01); *G02B 1/105* (2013.01); *G02B 5/3033* (2013.01); *B32B 2250/02* (2013.01); *C08L 2201/50* (2013.01); *C09J 2433/006* (2013.01); *G02F 1/133528* (2013.01); *G02F 2202/28* (2013.01); *Y10T 428/1462* (2015.01)

(56) References Cited

U.S. PATENT DOCUMENTS

| | | | |
|---|---|---|---|
| 8,199,289 | B2 | 6/2012 | Murakami et al. |
| 2001/0019766 | A1* | 9/2001 | Masuda et al. ............... 428/345 |
| 2005/0030456 | A1 | 2/2005 | Murakami et al. |
| 2005/0084670 | A1* | 4/2005 | Satake et al. ................ 428/343 |
| 2006/0238681 | A1 | 10/2006 | Murakami et al. |
| 2009/0059369 | A1* | 3/2009 | Otome .................... G02B 1/105 359/489.2 |
| 2009/0067047 | A1 | 3/2009 | Ueda et al. |
| 2009/0135345 | A1 | 5/2009 | Yajima et al. |
| 2009/0153965 | A1* | 6/2009 | Ito ........................... G02B 5/30 359/489.2 |
| 2009/0202822 | A1* | 8/2009 | Hasegawa et al. ........... 428/339 |
| 2009/0257003 | A1 | 10/2009 | Yoshihara et al. |

FOREIGN PATENT DOCUMENTS

| | | | |
|---|---|---|---|
| JP | 09-176518 A | 7/1997 | |
| JP | 2001-72950 A | 3/2001 | |
| JP | 2006-215174 A | 8/2006 | |
| JP | 2006-308646 A | 11/2006 | |
| JP | 2007-041563 A | 2/2007 | |
| JP | 2007-126559 A | 5/2007 | |
| JP | 2007-127893 A | 5/2007 | |
| JP | 2007-279243 A | 10/2007 | |
| JP | 2007-333946 A | 12/2007 | |
| KR | 2007-0048600 A | 5/2007 | |
| KR | 2007-0070227 A | 7/2007 | |
| TW | 200740587 A | 11/2007 | |
| TW | 200740605 A | 11/2007 | |
| WO | 2006/057800 A1 | 6/2006 | |
| WO | WO 2006/112207 A1 * | 10/2006 | ............... G02B 5/30 |
| WO | WO 2006/112223 A1 * | 10/2006 | ............... G02B 5/30 |
| WO | 2007/000961 A1 | 1/2007 | |
| WO | 2007/032304 A1 | 3/2007 | |
| WO | 2007/105485 A1 | 9/2007 | |
| WO | WO 2007138850 A1 * | 12/2007 | |

OTHER PUBLICATIONS

Aldrich Data Sheet (2012).*
Dougherty et al. Acryloyl Morpholine for UV Curing, Radtech Report, pp. 22-27, (2007).*
Chinese Office Action dated Aug. 23, 2011, issued in corresponding Chinese Patent Application No. 200880125874.2.
International Search Report of PCT/JP2008/071661, Mailing Date of Jan. 13, 2009.
Japanese Office Action dated Oct. 9, 2013, issued in Japanese Patent Application No. 2008-303880, w/English translation.
Third party Observation dated May 31, 2013, issued in corresponding Japanese Patent Application No. 2008-303880 with English translation (41 pages).
Japanese Office Action dated Dec. 12, 2012, issued in corresponding Japanese Patent Application No. 2008-303880, with English translation (11 pages).
Office Action dated May 15, 2015, issued in counterpart Chinese Patent Application No. 201310656109.6, with English translation (17 pages).
Office Action dated May 7, 2014, issued in counterpart Taiwanese Patent Application No. 097148546, with English translation (9 pages).

* cited by examiner

POLARIZER PROTECTIVE FILM, POLARIZING PLATE, AND IMAGE DISPLAY APPARATUS

TECHNICAL FIELD

The present invention relates to a polarizer protective film, and a polarizing plate and an image display apparatus both using the polarizer protective film.

BACKGROUND ART

In a liquid crystal display apparatus as a typical image display apparatus, owing to an image forming system of the apparatus, it is indispensable to place polarizing plates on both sides of a liquid crystal cell. The polarizing plate usually has a configuration in which polarizer protective films are attached to both surfaces of a polarizer with an adhesive.

A (meth)acrylic resin excellent in heat resistance and transparency is proposed as a material for forming the above-mentioned polarizer protective film. In order to enhance the adhesion property between the polarizer and the polarizer protective film formed from the (meth)acrylic resin, it is proposed that an easy-adhesion layer should be formed from a polyester-based resin or a polyurethane resin between the polarizer and the polarizer protective film (for example, Patent Document 1). However, there are problems in that the adhesion property between the polarizer and the polarizer protective film (in particular, under high temperature and high humidity conditions) is not sufficient and in that retardation occurs.

Patent Document 1: JP 2007-127893 A

DISCLOSURE OF THE INVENTION

Problems to be Solved by the Invention

The present invention has been made to solve the above-mentioned conventional problems, and a main object of the present invention is to provide a polarizer protective film and a polarizing plate, both excellent in optical properties (retardation and haze) and excellent in the adhesion property between a polarizer and a polarizer protective film (in particular, under high temperature and high humidity conditions).

Means for Solving the Problems

According to one aspect of the present invention, a polarizer protective film is provided. The polarizer protective film includes a (meth)acrylic resin film and an easy-adhesion layer disposed on at least one side of the (meth) acrylic resin film. The easy-adhesion layer is formed from an aqueous (meth)acrylic resin dispersion.

In one embodiment of the invention, the easy-adhesion layer has a glass transition temperature of 20° C. or more. In another embodiment of the invention, the (meth)acrylic resin film includes a (meth)acrylic resin having a glass transition temperature of 100° C. or more.

In still another embodiment of the invention, the aqueous (meth)acrylic resin dispersion includes at least one kind of water-soluble monomer selected from the group consisting of a polyalkylene glycol (meth)acrylate, (meth)acryloyl morpholine, and a hydroxyalkyl (meth)acrylamide.

In still another embodiment of the invention, the easy-adhesion layer is formed by applying the aqueous (meth) acrylic resin dispersion onto the (meth)acrylic resin film to form an applied layer, stretching in at least a uniaxial direction the (meth)acrylic resin film on which the applied layer is formed, and subjecting the resultant (meth)acrylic resin film to a heat treatment.

In still another embodiment of the invention, an in-plane retardation $\Delta$nd is 1.0 nm or less, a thickness direction retardation Rth is 3.0 nm or less, and a haze is 1.0% or less.

According to another aspect of the present invention, a polarizing plate is provided. The polarizing plate includes a polarizer and the polarizer protective film being disposed on at least one side of the polarizer. The polarizer protective film includes an easy-adhesion layer disposed on a side facing the polarizer. In one embodiment of the invention, the polarizing plate further includes a pressure-sensitive adhesive layer.

According to still another aspect of the present invention, an image display apparatus is provided. The image display apparatus includes the polarizing plate.

Effects of the Invention

The present invention can provide the polarizer protective film and the polarizing plate, both excellent in optical properties (retardation and haze) and excellent in the adhesion property between the polarizer and the polarizer protective film (in particular, under high temperature and high humidity conditions), by forming an easy-adhesion layer from the aqueous (meth)acrylic resin dispersion on the (meth)acrylic resin film. The finding described above was obtained only by actually subjecting the polarizing plate having the easy-adhesion layer formed from the aqueous (meth)acrylic resin dispersion to high temperature and high humidity conditions, and hence the finding is an unexpected excellent effect.

Figure 1:
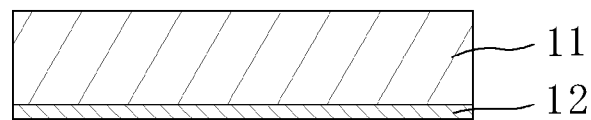
FIG. 1 is a schematic cross-sectional view of a polarizer protective film according to one preferred embodiment of the present invention.

DESCRIPTION OF SYMBOLS 10 polarizer protective film
11 (meth)acrylic resin film
12 easy-adhesion layer
13 polarizer
14 adhesive layer
100 polarizing plate

BEST MODE FOR CARRYING OUT THE INVENTION

Hereinafter, although the present invention will be described by way of a preferred embodiment, the present invention is not limited thereto.

DEFINITIONS OF TERMS AND SYMBOLS

The definitions of terms and symbols used in the present specification are as follows.

(1) Refractive Index (nx, ny, nz)

"nx" denotes a refractive index in a direction (i.e., a slow axis direction) in which a refractive index in a plane is maximum, "ny" denotes a refractive index in a direction perpendicular to a slow axis in a plane, and "nz" denotes a refractive index in a thickness direction.

(2) In-Plane Retardation (Δnd)

An in-plane retardation (Δnd) is obtained by Δnd=(nx−ny)×d, when d (nm) is a thickness of a layer (film).

(3) Thickness Direction Retardation (Rth)

A thickness direction retardation (Rth) is obtained by Rth=(nx−nz)×d, when d (nm) is a thickness of a layer (film).

A. Polarizer Protective Film

FIG. 1 is a schematic cross-sectional view of a polarizer protective film according to a preferred embodiment of the present invention. A polarizer protective film 10 has a (meth)acrylic resin film 11 and an easy-adhesion layer 12. In this embodiment, the easy-adhesion layer is disposed on only one side of the (meth)acrylic resin film, but the easy-adhesion layer may be disposed on each of both sides.

A-1. (Meth)Acrylic Resin Film

The above-mentioned (meth)acrylic resin film 11 is formed from a resin composition containing a (meth)acrylic resin as a main component. The glass transition temperature (Tg) of the (meth)acrylic resin is preferably 100° C. or more, more preferably 105° C. or more, still more preferably 110° C. or more. By including a (meth)acrylic resin having a glass transition temperature (Tg) of 100° C. or more as a main component, for example, the resultant polarizing plate in which such (meth)acrylic resin film incorporated have excellent durability.

As the (meth)acrylic resin, any suitable (meth)acrylic resin may be adopted. Examples of the (meth)acrylic resin include poly(meth)acrylates such as methyl polymethacrylate, a methyl methacrylate-(meth)acrylic acid copolymer, a methyl methacrylate-(meth)acrylate copolymer, a methyl methacrylate-acrylate-(meth)acrylic acid copolymer, a methyl (meth)acrylate-styrene copolymer (MS resin, etc.), and a polymer having an alicyclic hydrocarbon group (e.g., a methyl matharylate-cyclohexyl methacrylate copolymer, a methyl methacrylate-norbornyl (meth)acrylate copolymer). A preferred example includes $C_{1-6}$ alkyl poly (meth)acrylic acid such as polymethyl (meth)acrylate. A more preferred example includes a methyl methacrylate-based resin containing methyl methacrylate as a main component (50 to 100% by weight, preferably 70 to 100% by weight).

Specific examples of the (meth)acrylic resin include ACRYPET VH and ACRYPET VRL20A manufactured by Mitsubishi Rayon Co., Ltd., a (meth)acrylic resin having a ring structure in molecules described in JP 2007-063541 A and JP 2004-70296A, and a (meth)acrylic resin with high Tg obtained by intramolecular cross-linking or intramolecular cyclization reaction.

The content of the (meth)acrylic resin in the (meth)acrylic resin film is preferably 50 to 99% by weight, more preferably 60 to 98% by weight, still more preferably 70 to 97% by weight. When the content of the (meth)acrylic resin in the (meth)acrylic resin film is less than 50% by weight, high heat resistance and high transparency inherent in the (meth)acrylic resin may not be sufficiently reflected. When the content of the (meth)acrylic resin in the (meth)acrylic resin film exceeds 99% by weight, the mechanical strength may become poor.

The above-mentioned resin composition can contain any suitable additive in addition to the above-mentioned (meth)acrylic resin. Examples of the additive include a stabilizer, a lubricant, a processing assistant, a plasticizer, an antioxidant, an impact-resistant assistant, a retardation reducing agent, a UV absorber, a flatting agent, an antimicrobial agent, a fungicide, an anti-fog agent, and an antistatic agent.

The retardation reducing agent is preferably used. Regarding the optical properties of a polarizer protective film, the retardation in front and thickness directions poses a problem. Therefore, the resin composition preferably contains the retardation reducing agent. As the retardation reducing agent, a styrene-containing polymer such as an acrylonitrile-styrene block copolymer or a copolymer of an acrylonitrile-styrene block copolymer is preferably used. The content of the retardation reducing agent is preferably 30 parts by weight or less, more preferably 25 parts by weight or less, and still more preferably 20 parts by weight or less with respect to 100 parts by weight of the (meth)acrylic resin. In the case where the retardation reducing agent is added in an amount exceeding 30 parts by weight, visible light may be scattered and transparency may be impaired, with the result that the polarizer protective film may lack characteristics thereof.

The UV absorber is preferably used. In terms of the protection of a polarizer and a liquid crystal panel, in order to provide weather resistance, the resin composition preferably contains the UV absorber. The melting point of the UV absorber is preferably 110° C. or more, and more preferably 120° C. or more. When the melting point of the UV absorber is 110° C. or more, volatilization during heat-melting occurs less, which can suppress contamination of a roll in the course of production of a film. As the UV absorber, a benzotriazole-based UV absorber with a molecular weight of 400 or more or a triazine-based UV absorber with a molecular weight of 400 or more is particularly preferably used. Examples of commercially available products thereof include "TINUVIN 1577" (manufactured by Ciba Specialty Chemicals Inc.) and "ADEKASTAB LA-31" (manufactured by ADEKA Corporation).

Any suitable forming method can be adopted as a forming method for the above-mentioned (meth)acrylic resin film. Examples of the forming method preferably include an extrusion molding method (melt extrusion method such as a T-die method and an inflation method), a cast forming method (such as a melt flow casting method), and a calendar forming method. The extrusion molding method is excellent in productivity because the method does not need, unlike a dry lamination method, a solvent-drying step for scattering a solvent (for example, an organic solvent in an adhesive for dry lamination) which is used during processing. There is exemplified, as the extrusion molding method, a method of forming a film in which the above-mentioned resin composition is fed into an extruder connected to a T-die, and is subjected to melt kneading, extrusion, water-cooling, and withdrawing. The extruder may be of a uniaxial or biaxial screw type.

When the above-mentioned (meth)acrylic resin film is formed by using the extrusion molding method, it is preferred to perform biaxial kneading using direct adding or a master batch method. There is exemplified, as a kneading method, a method in which kneading is performed by using TEM manufactured by Toshiba Machine Co., Ltd. or the like with the temperature of a resin set in such a manner that the temperature preferably falls within the range of 230 to 270° C. When the temperature becomes too high, the decomposition of a (meth)acrylic resin may be easily accelerated. When the polarizer protective film of the present invention is formed by the cast forming method (forming by casting), it is preferred to dissolve and blend the above-mentioned resin composition at the time of preparation of a cast solution. Further, heating is preferably performed, if required.

The extrusion molding temperature in the above-mentioned extrusion molding method can be set to any suitable value. When the glass transition temperature of the resin composition is referred to as Tg (° C.), the extrusion molding temperature is preferably (Tg+80)° C. to (Tg+180)° C., and more preferably (Tg+100)° C. to (Tg+150)° C. When the extrusion molding temperature is too low, a resin may not be formed due to lack of flowability. When the extrusion molding temperature is too high, the viscosity of a resin becomes low, which may cause a problem in production stability such as non-uniform thickness of a formed product.

The above-mentioned (meth)acrylic resin film may be an unstretched film or a stretched film. In the case of the stretched film, the film may be a uniaxially-stretched film or a biaxially-stretched film, and is preferably the uniaxially-stretched film (for example, a longitudinally stretched film). The details thereof are described later in the section A-3.

The production conditions (stretching temperature and stretching ratio) of the above-mentioned stretched film can be set to any suitable value. The stretching temperature is preferably in the vicinity of a glass transition temperature (Tg) of the resin composition, and the specific temperature is preferably (Tg−30)° C. to (Tg+100)° C. and more preferably (Tg−20)° C. to (Tg+80)° C. When the stretching temperature is lower than (Tg−30)° C., there is a possibility that a sufficient stretching ratio may not be obtained. On the contrary, when the stretching temperature exceeds (Tg+100)° C., flow of the resin composition occurs, which may prevent stable stretching.

The stretching ratio defined in an area ratio is preferably 1.1 to 25 times, more preferably 1.3 to 10 times and most preferably 2.0 to 5.0 times. The stretching ratio of less than 1.1 times may not lead to the enhancement of toughness involved in stretching. When the stretching ratio exceeds 25 times, the effect to be obtained by enhancing the stretching ratio may not be recognized.

A-2. Easy-Adhesion Layer

The above-mentioned easy-adhesion layer 12 is formed from an aqueous (meth)acrylic resin dispersion. The aqueous (meth)acrylic resin dispersion is typically obtained by subjecting a monomer composition to emulsification polymerization by using an emulsifier.

The above-mentioned monomer composition preferably includes at least one kind of water-soluble monomer selected from the group consisting of a polyalkylene glycol (meth)acrylate, (meth)acryloyl morpholine, and a hydroxyalkyl (meth)acrylamide. Using the water-soluble monomer described above can result in a polarizer protective film which is more excellent in the adhesion property between a polarizer and a polarizer protective film (even under high temperature and high humidity conditions).

Specific examples of the polyalkylene glycol (meth)acrylate include polyethylene glycol monoacrylate, polypropylene glycol monoacrylate, polybutylene glycol monoacrylate, methoxy polyethylene glycol monoacrylate, methoxy polypropylene glycol monoacrylate, methoxy polybutylene glycol monoacrylate, ethoxy polyethylene glycol monoacrylate, ethoxy polypropylene glycol monoacrylate, and ethoxy polybutylene glycol monoacrylate. They may be used alone or in combination. Of those, those in which an alkyl group is an ethyl group or a propyl group are preferably used.

Specific examples of the hydroxyalkyl (meth)acrylamide include N-hydroxyethyl acrylamide, N-hydroxypropyl acrylamide, N-hydroxyisopropyl acrylamide, N-1-ethyl-2-hydroxyethyl acrylamide, N-hydroxyethoxyethyl acrylamide, N-methyl-N-hydroxyethyl acrylamide, N-ethyl-N-hydroxyethyl acrylamide, N,N-dihydroxyethyl acrylamide, and 1-acryloyl-4-hydroxypiperidine. Of those, N-hydroxyethyl acrylamide and N-hydroxyisopropyl acrylamide are preferred.

In addition to the above-mentioned monomers, any appropriate other monomers may be included into the monomer composition. Examples of the other monomers include: monomers each having a hydroxyl group such as 2-hydroxyethyl (meth)acrylate, 2-hydroxypropyl (meth)acrylate, 3-hydroxypropyl (meth)acrylate, 2-hydroxybutyl (meth)acrylate, and 4-hydroxybutyl (meth)acrylate; monomers each having a cycloalkyl group such as cyclohexyl (meth)acrylate, methylcyclohexyl (meth)acrylate, tert-butylcyclohexyl (meth)acrylate, cyclooctyl (meth)acrylate, cyclododecyl (meth)acrylate, isobornyl methacrylate, isobornyl acrylate, dicyclopentanyl methacrylate, dicyclopentanyl acrylate, 4-methylol cyclohexylmethyl acrylate, 4-methylcyclohexylmethyl (meth)acrylate, and cyclohexylmethyl (meth)acrylate; and monomers each having an epoxy group such as glycidyl (meth)acrylate, α-methyl glycidyl acrylate, glycidyl allyl ether, oxocyclohexylmethyl (meth)acrylate, 3,4-epoxycyclohexylmethyl acrylate, α-methyl glycidyl methacrylate, and 3,4-epoxycyclohexylmethyl methacrylate. Further examples of the other monomers include: (meth)acrylic acid esters such as methyl (meth)acrylate, ethyl (meth)acrylate, butyl (meth)acrylate, and 2-ethylhexyl (meth)acrylate; monomers each having a carboxyl group such as (meth)acrylic acid, maleic acid, fumaric acid, crotonic acid, itaconic acid, citraconic acid, maleic anhydride, monomethyl maleate, monobutyl maleate, monomethyl itaconate, monobutyl itaconate, vinylbenzoic acid, monohydroxyethyl (meth)acrylate oxalate, dimethylmaleate, diethyl maleate, dibutyl maleate, dimethyl fumarate, and dibutyl fumarate; monomers each having an aziridinyl group such as (meth)acryloyl aziridine and 2-aziridinyl ethyl (meth)acrylate; monomers each having an oxazoline group such as 2-isopropenyl-2-oxazoline and 2-vinyl-2-oxazoline; acrylamide derivatives such as (meth)acrylamide, N-monoethyl (meth)acrylamide, N-monomethyl (meth)acrylamide, N,N-dimethyl (meth)acrylamide, N-n-propyl (meth)acrylamide, N-isopropyl (meth)acrylamide, and N-n-butyl (meth)acrylamide; styrene derivatives such as styrene, vinyltoluene, α-methylstyrene, and chloromethylstyrene; monomers each having a cyano group such as (meth)acrylonitrile; dimethylaminoethyl (meth)acrylate; dimethylaminoethyl (meth)acrylamide; vinylpyridine; vinylimidazole; and vinylpyrrolidone.

Any suitable emulsifier can be used as the above-mentioned emulsifier. Example of the emulsifier preferably include an anionic surfactant, a nonionic surfactant, a cationic surfactant, an amphoteric surfactant, a polymer surfactant, and a polymerizable surfactant having one or more polymerizable carbon-carbon unsaturated bonds in each of its molecules. They may be used alone or in combination.

Any appropriate anionic surfactant may be used as the anionic surfactant. Preferred examples of the anionic surfactant include alkali metal alkyl sulfates such as sodium dodecyl sulfate and potassium dodecyl sulfate; ammonium alkyl sulfates such as ammonium dodecyl sulfate; sodium dodecyl polyglycol ether sulfate, sodium sulfonate and alkali metal salts of sulfonated paraffin; alkyl sulfonates such as an ammonium salt of sulfonated paraffin; fatty acid salts such as sodium laurate, triethanolamine olate, and triethanolamine abietate; alkylaryl sulfonates such as sodium dodecylbenzene sulfonate and an alkali metal sulfate of alkali phenol hydroxyethylene; higher alkyl naphthalenesulfonate; a naphthalenesulfonic acid formalin condensate; dialkyl sulfosuccinate; polyoxyethylene alkyl sulfate; and polyoxyethylene alkyl aryl sulfate.

Any appropriate nonionic surfactant can be used as the nonionic surfactant. Preferred examples thereof include: fatty acid monoglycerides such as polyoxyethylene alkyl ether, polyoxyethylene alkylaryl ether, sorbitan fatty acid ester, polyoxyethylene sorbitan fatty acid ester, and glycerol monolaurate; polyoxyethylene oxypropylene copolymer; and a condensation product of ethylene oxide and a fatty acid amine, amide or acid.

Any appropriate cationic surfactant can be used as the cationic surfactant. Preferred examples thereof include alkyl pyridinyl chloride and alkyl ammonium chloride.

Any appropriate amphoteric surfactant can be used as the amphoteric surfactant. Preferred examples thereof include lauryl betaine, stearyl betaine, and lauryl dimethylamine oxide.

Any appropriate polymer surfactant can be used as the polymer surfactant. Preferred examples thereof include polyvinyl alcohol, sodium poly(meth)acrylate, potassium poly(meth)acrylate, ammonium poly(meth)acrylate, polyhydroxyethyl (meth)acrylate, polyhydroxypropyl (meth)acrylate, copolymers of two or more kinds of polymerizable monomers that are constitutional units of those polymers, or copolymers of any of these monomers with other monomers, and phase-transfer catalysts of crown ethers.

Any appropriate polymerizable surfactant can be used as the polymerizable surfactant. Preferred examples thereof include anionic polymerizable surfactants such as sodium propenyl-2-ethylhexylbenzenesulfosuccinate, sulfate ester of polyoxyethylene (meth)acrylate, ammonium polyoxyethylene alkyl propenyl ether sulfate, and phosphate ester of polyoxyethylene (meth)acrylate; and nonionic polymerizable surfactants such as polyoxyethylene alkylbenzene ether (meth)acrylate and polyoxyethylene alkyl ether (meth)acrylate.

Any suitable emulsification polymerization method can be adopted as the above-mentioned emulsification polymerization method. Examples of the emulsification polymerization method include a method in which a monomer composition, an emulsifier, a polymerization initiator, and an aqueous medium are added simultaneously, a so-called monomer-dropping method, and a so-called pre-emulsion method. Alternatively, multi-step polymerization such as seed polymerization, core-shell polymerization, or power feed polymerization may be carried out to produce emulsion particles having a different phase structure.

The blending amount (total blending amount) of the above-mentioned emulsifier can be set to any suitable value. The blending amount of the emulsifier is preferably 0.5 to 10 parts by weight with respect to 100 parts by weight of the above-mentioned monomer composition. Water is usually used as the above-mentioned aqueous medium, and a hydrophilic solvent such as a lower alcohol or a ketone can be used in combination with water, if required. Any suitable polymerization initiator can be used as the above-mentioned polymerization initiator. Specific examples of the polymerization initiator include: water-soluble azo compounds such as 2,2'-azobisisobutyronitrile, 2,2'-azobis(2-amidinopropane) dihydrochloride, and 4,4'-azobis(4-cyanopentanoic acid); persulfates such as potassium persulfate; and peroxides such as hydrogen peroxide, peroxyacetic acid, benzoyl peroxide, and di-t-butyl peroxide. They may be used alone or in combination. The blending amount of the polymerization initiator is preferably 0.01 to 1 part by weight with respect to 100 parts by weight of the monomer composition.

When the above-mentioned emulsification polymerization is carried out, it is possible to, for accelerating a polymerization rate, or in carrying out polymerization at low temperatures, use a reducing agent such as sodium bisulfite, ferrous chloride, an ascorbate, or rongalit. Alternatively, when the above-mentioned emulsification polymerization is carried out, it is possible to use a chain transfer agent such as t-dodecyl mercaptan, n-octyl mercaptan, n-dodecyl mercaptan, mercaptoacetic acid, mercaptopropionic acid, and 2-mercaptoethanol.

The polymerization temperature and polymerization time of the above-mentioned emulsification polymerization can be set to any suitable values. The polymerization temperature is preferably 0 to 100° C., or more preferably 50 to 90° C. The polymerization time is preferably 1 to 15 hours.

The above-mentioned aqueous (meth)acrylic resin dispersion is preferably neutralized with a neutralizer in order to enhance the stability of the dispersion. The pH of the aqueous (meth)acrylic resin dispersion is preferably 5 to 10, more preferably 6 to 9.5, or still more preferably 7 to 9.5. If the pH is less than 5, the stability and mechanical stability of the dispersion may lower. If the pH is more than 10, problems in practicality such as lowered water resistance and occurrence of odor may be caused.

Any suitable neutralizer can be used as the above-mentioned neutralizer. Specific examples of the neutralizer include: alkali metal compounds such as sodium hydroxide and potassium hydroxide; alkali earth metal compounds such as calcium hydroxide and calcium carbonate; ammonia; and water-soluble organic amines such as dimethylaminoethanol, monomethylamine, dimethylamine, trimethylamine, monoethylamine, diethylamine, triethylamine, monopropylamine, dimethylpropylamine, monoethanolamine, diethanolamine, triethanolamine, ethylenediamine, and diethylenetriamine. Those neutralizers may be used alone or in combination. Of those, ammonia and tertiary amines such as dimethylaminoethanol, triethanolamine, and trimethylamine are preferably used, and more preferably used are ammonia and low-boiling-point amines such as dimethylaminoethanol and trimethylamine. Using one of those neutralizers results in an easy-adhesion layer excellent in water resistance.

The above-mentioned aqueous (meth)acrylic resin dispersion can contain any suitable additive. Examples of the additive include a cross-linking agent, a stabilizer, a lubricant, a processing assistant, a plasticizer, an impact-resistant assistant, a retardation reducing agent, a UV absorber, a flatting agent, an antimicrobial agent, a fungicide, an anti-fog agent, and an antistatic agent.

The resin solid content of the above-mentioned aqueous (meth)acrylic resin dispersion is preferably 2 to 35 wt %, or more preferably 4 to 15 wt %, because workability during the formation of the easy-adhesion layer can become excellent. It should be noted that forming methods of the easy-adhesion layer are described later in the section A-3.

The easy-adhesion layer formed from the above-mentioned aqueous (meth)acrylic resin dispersion has a glass transition temperature of preferably 20° C. or more, more preferably 25 to 100° C., or still more preferably 30 to 80° C. Because the easy-adhesion layer has a glass transition temperature of 20° C. or more, blocking can be prevented when a (meth)acrylic resin film on which the easy-adhesion layers are laminated is subjected to roll processing, and high adhesion property with a substrate (such as a polarizer) can be provided.

A-3. Production Method

The polarizer protective film of the present invention is provided typically by applying the above-mentioned aqueous (meth)acrylic resin dispersion on at least one-side surface of the above-mentioned (meth)acrylic resin film, followed by drying. Any suitable method can be used as a method of applying the aqueous (meth)acrylic resin dispersion. Examples of the method include a reverse roll coating method, a gravure coating method, a kiss coating method, a die coater method, a roll brushing method, a spray coating method, an air knife coating method, a wire bar coating method, a pipe doctor method, an impregnation coating method, and a curtain coating method. Those methods may be used alone or in combination.

The application of the above-mentioned aqueous (meth) acrylic resin dispersion can be carried out at any suitable stage in a forming process of the (meth)acrylic resin film. For example, an applied layer is formed by applying the aqueous (meth)acrylic resin dispersion to an unstretched or stretched (preferably uniaxially stretched) (meth)acrylic resin film, followed by drying. An easy-adhesion layer is preferably formed by stretching in at least a uniaxial direction the (meth)acrylic resin film on which the applied layer is formed, and then performing a heat treatment. To be specific, a film on which an applied layer has been formed is introduced into a stretching machine (for example, a tenter stretching machine) to perform stretching and a heat treatment. By preliminarily forming the applied layer and then performing stretching and a heat treatment as described above, the particles, which have been dispersed in an aqueous solvent, of the (meth)acrylic resin can be fused with each other owing to the amount of heat or the like at the time of the stretching, and hence the easy-adhesion layer can become a dense (meth)acrylic resin layer. As a result, it is possible to obtain with high productivity a polarizer protective film which is more excellent in the adhesion property between a polarizer and a polarizer protective film (even under high temperature and high humidity conditions) and is also more excellent in optical properties. In addition, the resultant polarizer protective film can be excellent in a mechanical strength. On the other hand, when an easy-adhesion layer is formed by simply applying an aqueous (meth)acrylic resin dispersion to a stretched (for example, biaxially stretched) (meth)acrylic resin film, followed by drying, there may be no other way but to suppress the amount of heat in order to suppress the deterioration of the transparency of the (meth)acrylic resin and the variation of its physical properties because of a heat treatment. To be specific, when the (meth)acrylic resin film is heated up to around its Tg, the film may be deformed (shrunk), and hence the amount of heat needs to be suppressed. As a result, the amount of heat is not sufficient for causing a thermal cross-linking reaction, and hence forming a dense (meth) acrylic resin layer may be difficult. Meanwhile, by preliminarily forming the applied layer and then performing stretching and a heat treatment, it is not necessary to apply the aqueous (meth)acrylic resin dispersion in a wide range, and hence productivity can be extremely excellent.

The above-mentioned stretching performed after the formation of the applied layer is preferably lateral stretching. Any suitable stretching condition can be set as a stretching condition for the stretching performed after the formation of the applied layer. The stretching temperature is preferably near the glass transition temperature (Tg) of the above-mentioned resin composition. To be specific, the stretching temperature is preferably $(Tg-30)° C.$ to $(Tg+100)° C.$, or more preferably $(Tg-20)° C.$ to $(Tg+80)° C.$ If the stretching temperature is less than $(Tg-30)° C.$, sufficient stretching ratio may not be provided. By contrast, if the stretching temperature is more than $(Tg+100)° C.$, flow of the resin composition occurs, and hence stable stretching may not be carried out. The stretching ratio defined based on an area ratio is preferably 1.1 to 25 times, more preferably 1.3 to 10 times, or most preferably 2.0 to 5.0 times. If the stretching ratio is less than 1.1 times, toughness involved in the stretching may not be enhanced. If the stretching ratio is more than 25 times, the effect of raising the stretching ratio may not be recognized.

The polarizer protective film of the present invention has a thickness of preferably 20 to 200 µm, more preferably 30 to 180 µm, or still more preferably 40 to 140 µm. If the thickness is 20 µm or more, the polarizer protective film has proper strength and rigidity, and hence the handling performance of the polarizer protective film during secondary processing such as lamination and printing becomes favorable. Moreover, it is easy to control a retardation produced by a stress at the time of withdrawing, and the production of the polarizer protective film can be conducted stably and easily. If the thickness is 200 µm or less, winding the film becomes easy, and besides, controlling a production process (such as a line speed) becomes easy.

The attachment amount of the easy-adhesion layer with respect to the (meth)acrylic resin film is preferably 0.02 to 0.5 $g/m^2$, or more preferably 0.1 to 2 $g/m^2$. If the attachment amount is less than 0.02 $g/m^2$, an effect on adhesion property is not substantially exhibited, and besides, adhesion durability under heating or under humidification may deteriorate. The thickness of the easy-adhesion layer is preferably 20 nm to 5 µm, or more preferably 100 nm to 2 µm.

A-4. Optical Properties

The in-plane retardation $\Delta nd$ of the polarizer protective film is preferably 1.0 nm or less, more preferably 0.9 nm or less, and still more preferably 0.8 nm or less. The thickness direction retardation Rth of the polarizer protective film is preferably 3.0 nm or less, more preferably 2.7 nm or less, still more preferably 2.5 nm or less, particularly preferably 2.3 nm or less, and most preferably 2.0 nm or less.

The haze of the polarizer protective film is preferably 1.0% or less, more preferably 0.9% or less, still more preferably 0.8% or less, and particularly preferably 0.7% or less. If the haze is 1.0% or less, the film can be visually provided with satisfactory clear feeling, and even if the polarizer protective film is used as a lighting member such as a window, both visibility and lighting property can be obtained. In addition, even if the polarizer protective film is used as a front plate of a display apparatus, display contents can be visually recognized satisfactorily. Thus, the polarizer protective film has a high industrial use value.

B. Polarizing Plate

Figure 2:
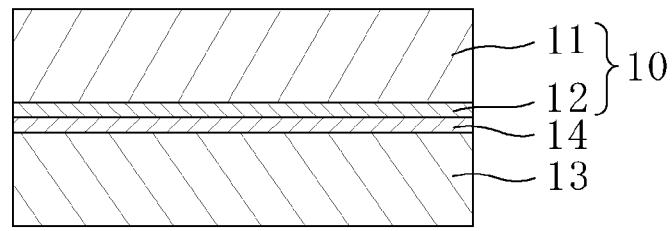
FIG. 2 is a schematic cross-sectional view of a polarizing plate according to one preferred embodiment of the present invention.

FIG. 2 is a schematic cross-sectional view of a polarizing plate according to a preferred embodiment of the present invention. The polarizing plate 100 has a polarizer 13 and a polarizer protective film 10 of the present invention disposed on one side of the polarizer 13. The polarizer protective film 10 is provided so that an easy-adhesion layer 12 is positioned on the side facing the polarizer 13. The polarizer protective film 10 is attached to the polarizer 13 via an adhesive layer 14.

In one embodiment, though not illustrated, the polarizing plate 100 may have a second polarizer protective film disposed on the other side of the polarizer 13. The second polarizer protective film may be a polarizer protective film of the present invention. In another embodiment, the polarizing plate 100 may have a film for providing different functional properties disposed on the other side of the polarizer 13.

The polarizing plate of the present invention may further have a pressure-sensitive adhesive layer (a polarizing plate of this kind may be referred to as a "pressure-sensitive adhesive polarizing plate"). The pressure-sensitive adhesive layer is typically provided as an outermost layer of the polarizing plate. To be specific, the pressure-sensitive adhesive layer is disposed on the side with no polarizer provided, of the above-mentioned polarizer protective film 10 (second polarizer protective film) or of the film for providing different functional properties. Adopting the configuration described above results in the adhesion of the polarizing plate of the present invention to another optical member such as an optical film or a liquid crystal cell. In a particularly preferred embodiment, the pressure-sensitive adhesive layer is disposed on the side with no polarizer provided, of the above-mentioned polarizer protective film 10.

B-1. Polarizer

The polarizer 13 is typically formed from a polyvinyl alcohol-based resin. The polarizer is typically produced by: coloring a polyvinyl alcohol-based resin film with a dichromatic substance (typically, iodine or a dichromatic dye); and uniaxially stretching the film. The degree of polymerization of the polyvinyl alcohol-based resin is preferably 100 to 5,000, and more preferably 1,400 to 4,000. The polyvinyl alcohol-based resin film may be formed by any appropriate method (such as a flow casting method involving film formation through flow casting of a solution containing a resin dissolved in water or an organic solvent, a casting method, or an extrusion method). The thickness of the polarizer may appropriately be set in accordance with the purpose and application of image display apparatus employing the polarizer. The thickness of the polarizer is typically 5 to 80 μm.

A method of producing the polarizer may employ any appropriate method in accordance with the purpose, materials to be used, conditions, and the like. Typically, the method employs a method of subjecting the polyvinyl alcohol-based resin film to a series of production steps including swelling, coloring, crosslinking, stretching, water washing, and drying steps. In each treatment step excluding the drying step, the polyvinyl alcohol-based resin film is immersed in a bath containing a solution to be used in each step for treatment. The order, number of times, and absence or presence of swelling, coloring, crosslinking, stretching, water washing, and drying steps may appropriately be set in accordance with the purpose, materials to be used, conditions, and the like. For example, several treatments may be conducted at the same time in one step, or specific treatments may be omitted. More specifically, stretching treatment, for example, may be conducted after coloring treatment, before coloring treatment, or at the same time as swelling treatment, coloring treatment, and crosslinking treatment. For example, crosslinking treatment is preferably conducted before or after stretching treatment. For example, water washing treatment may be conducted after each treatment or after specific treatments.

The swelling step is typically conducted by immersing the polyvinyl alcohol-based resin film in a treatment bath (swelling bath) filled with water. This treatment allows washing away of contaminants on a surface of the polyvinyl alcohol-based resin film, washing away of an anti-blocking agent, and swelling of the polyvinyl alcohol-based resin film, to thereby prevent non-uniformity such as uneven coloring or the like. The swelling bath may appropriately contain glycerin, potassium iodide, or the like added. A temperature of the swelling bath is typically about 20 to 60° C., and an immersion time in the swelling bath is typically about 0.1 to 10 minutes.

The coloring step is typically conducted by immersing the polyvinyl alcohol-based resin film in a treatment bath (coloring bath) containing a dichromatic substance such as iodine. As a solvent to be used for a solution of the coloring bath, water is generally used, but an appropriate amount of an organic solvent having compatibility with water may be added. The dichromatic substance is typically used in a ratio of 0.1 to 1.0 part by weight with respect to 100 parts by weight of the solvent. In the case where iodine is used as a dichromatic substance, the solution of the coloring bath preferably further contains an assistant such as an iodide for improving a coloring efficiency. The assistant is used in a ratio of preferably 0.02 to 20 parts by weight, and more preferably 2 to 10 parts by weight with respect to 100 parts by weight of the solvent. Specific examples of the iodide include potassium iodide, lithium iodide, sodium iodide, zinc iodide, aluminum iodide, lead iodide, copper iodide, barium iodide, calcium iodide, tin iodide, and titanium iodide. The temperature of the coloring bath is typically about 20 to 70° C., and the immersion time in the coloring bath is typically about 1 to 20 minutes.

The crosslinking step is typically conducted by immersing the polyvinyl alcohol-based resin film subjected to the coloring treatment in a treatment bath (crosslinking bath) containing a crosslinking agent. The crosslinking agent may employ any appropriate crosslinking agent. Specific examples of the crosslinking agent include: a boron compound such as boric acid or borax; glyoxal; and glutaraldehyde. The crosslinking agent may be used alone, or used in combination. As a solvent to be used for a solution of the crosslinking bath, water is generally used, but an appropriate amount of an organic solvent having compatibility with water may be added. The crosslinking agent is typically used in a ratio of 1 to 10 parts by weight with respect to 100 parts by weight of the solvent. In the case where a concentration of the crosslinking agent is less than 1 part by weight, sufficient optical properties are often not obtained. In the case where the concentration of the crosslinking agent is more than 10 parts by weight, stretching force to be generated on the film during stretching increases and a polarizing plate to be obtained may shrink. The solution of the crosslinking bath preferably further contains an assistant such as an iodide for obtaining uniform properties in the plane of the film. The concentration of the assistant is preferably 0.05 to 15 wt %, and more preferably 0.5 to 8 wt %. Specific examples of the iodide are the same as those for the coloring step. The temperature of the crosslinking bath is typically about 20 to 70° C., and preferably 40 to 60° C. The immersion time in the crosslinking bath is typically about 1 second to 15 minutes, and preferably 5 seconds to 10 minutes.

The stretching step may be conducted at any time as described above. Specifically, the stretching step may be conducted after the coloring treatment, before the coloring treatment, at the same time as the swelling treatment, the coloring treatment, and the crosslinking treatment, or after the crosslinking treatment. A cumulative stretching ratio of the polyvinyl alcohol-based resin film is 5 times or more, preferably 5 to 7 times, and more preferably 5 to 6.5 times. In the case where the cumulative stretching ratio is less than 5 times, a polarizing plate having a high degree of polarization may be hardly obtained. In the case where the cumulative stretching ratio is more than 7 times, the polyvinyl alcohol-based resin film (polarizer) may easily break. A specific method of stretching may employ any appropriate method. For example, in the case where a wet stretching method is employed, a polyvinyl alcohol-based resin film is stretched in a treatment bath (stretching bath) to a predetermined ratio. A solution of the stretching bath to be preferably used is a solution containing various metal salts or compounds of iodine, boron, or zinc added to a solvent such as water or an organic solvent (such as ethanol).

The water washing step is typically conduced by immersing the polyvinyl alcohol-based resin film subjected to the various treatments in a treatment bath (water washing bath). The water washing step allows washing away of unnecessary remains of the polyvinyl alcohol-based resin film. The water washing bath may contain pure water or an aqueous solution containing iodide (such as potassium iodide or sodium iodide). The concentration of an aqueous iodide solution is preferably 0.1 to 10 wt %. The aqueous iodide solution may contain an assistant such as zinc sulfate or zinc chloride. The temperature of the water washing bath is preferably 10 to 60° C., and more preferably 30 to 40° C., and the immersion time is typically 1 second to 1 minute. The water washing step may be conducted only once, or may be conducted a plurality of times as required. In the case where the water washing step is conducted a plurality of times, the kind and concentration of the additive included in the water washing bath to be used for each treatment may appropriately be adjusted. For example, the water washing step includes a step of immersing a polyvinyl alcohol-based resin film in an aqueous potassium iodide solution (0.1 to 10 wt %, 10 to 60° C.) for 1 second to 1 minute and a step of washing the polyvinyl alcohol-based resin film with pure water.

The drying step may employ any appropriate drying method (such as natural drying, air drying, or heat drying). For example, in heat drying, a drying temperature is typically 20 to 80° C., and a drying time is typically 1 to 10 minutes. As described above, the polarizer is obtained.

B-2. Adhesive Layer

Any suitable adhesive can be used as an adhesive for forming the above-mentioned adhesive layer 14. The adhesive layer 14 is preferably formed from an adhesive composition containing a polyvinyl alcohol-based resin and a cross-linking agent.

Any appropriate polyvinyl alcohol-based resin may be used as the polyvinyl alcohol-based resin. Examples thereof include: a saponified product of polyvinyl acetate, and derivatives of the saponified product; a saponified product of a copolymer obtained by copolymerizing vinyl acetate with a monomer having copolymerizability; and a modified polyvinyl alcohol obtained by subjecting polyvinyl alcohol to acetalization, urethanation, etherification, grafting, phosphorylation, or the like. Examples of the monomer include: unsaturated carboxylic acids such as maleic acid (or anhydride), fumaric acid, crotonic acid, itaconic acid, and (meth) acrylic acid and esters thereof; α-olefins such as ethylene and propylene; (meth)allyl sulfonic acid (or sodium (meth) allyl sulfonate); sodium sulfonate (monoalkylmalate); sodium disulfonate alkylmalate; N-methylol acrylamide; alkali salts of acrylamide alkylsulfonate; N-vinylpyrrolidone; and derivatives of N-vinylpyrrolidone. They may be used alone or in combination.

The polyvinyl alcohol-based resin has, from the viewpoint of adhesion property, an average polymerization degree of preferably 100 to 3000, and more preferably 500 to 3000. The average saponification degree is, from the viewpoint of adhesion property, preferably 85 to 100 mol %, and more preferably 90 to 100 mol %.

A polyvinyl alcohol resin containing an acetoacetyl group is preferred as the polyvinyl alcohol-based resin. This is because the polyvinyl alcohol resin containing an acetoacetyl group has a highly reactive functional group, can improve adhesiveness between a polarizer and a protective film, and can improve durability of a polarizing plate.

The polyvinyl alcohol-based resin containing an acetoacetyl group is obtained, for example, in a reaction between a polyvinyl alcohol-based resin and diketene by any method. Specific examples of the method include: a method involving dispersing a polyvinyl alcohol-based resin in a solvent such as acetic acid, and adding diketene to the dispersion; a method involving dissolving a polyvinyl alcohol-based resin in a solvent such as dimethylformamide or dioxane, and adding diketene thereto; and a method involving directly bringing diketene gas or liquid diketene into contact with a polyvinyl alcohol-based resin.

A degree of acetoacetyl group modification of the polyvinyl alcohol-based resin containing an acetoacetyl group is typically 0.1 mol % or more, preferably 0.1 to about 40 mol %, and more preferably 1 to 20 mol %. A degree of acetoacetyl group modification of less than 0.1 mol % may provide insufficient water resistance with the adhesive layer. A degree of acetoacetyl group modification of more than 40 mol % decreases the number of reaction sites with the cross-linking agent described below and provides a small effect of improving the water resistance. It should be noted that the degree of acetoacetyl group modification is a value measured by NMR.

Any appropriate cross-linking agent may be used as the cross-linking agent. Preferably, a compound having at least two functional groups each having reactivity with the polyvinyl alcohol-based resin is used. Examples of the compound include: alkylenediamines having an alkylene group and two amino groups such as ethylenediamine, triethylenediamine, and hexamethylenediamine (of those, hexamethylenediamine is preferred); isocyanates such as tolylene diisocyanate, hydrogenated tolylene diisocyanate, a trimethylol propane tolylene diisocyanate adduct, triphenylmethane triisocyanate, methylene bis(4-phenylmethane)triisocyanate, isophorone diisocyanate, and ketoxime blocked compounds or phenol blocked compounds thereof; epoxies such as ethylene glycol diglycidyl ether, polyethylene glycol diglycidyl ether, glycerin di- or triglycidyl ether, 1,6-hexanediol diglycidyl ether, trimethylol propane triglycidyl ether, diglycidyl aniline, and diglycidyl amine; monoaldehydes such as formaldehyde, acetaldehyde, propionaldehyde, and butylaldehyde; dialdehydes such as glyoxal, malondialdehyde, succindialdehyde, glutardialdehyde, maleic dialdehyde, and phthaldialdehyde; an amino-formaldehyde resin such as a condensate of formaldehyde with methylol urea, methylol melamine, alkylated methylol urea, alkylated methylol melamine, acetoguanamine, or benzoguanamine; and salts of divalent or trivalent metals such as sodium, potassium, magnesium, calcium, aluminum, iron, and nickel and oxides thereof. Of those, a melamine-based cross-linking agent is preferred, and methylol melamine is particularly suited.

A content of the cross-linking agent is preferably 0.1 to 35 parts by weight, and more preferably 10 to 25 parts by weight with respect to 100 parts by weight of the polyvinyl alcohol-based resin. Meanwhile, for further improving the durability, the cross-linking agent may be contained within a range of more than 30 parts by weight and 46 parts by weight or less with respect to 100 parts by weight of the polyvinyl alcohol-based resin. In particular, in the case where the polyvinyl alcohol-based resin containing an acetoacetyl group is used, the cross-linking agent is preferably contained in an amount of more than 30 parts by weight. The cross-linking agent is contained within a range of more than 30 parts by weight and 46 parts by weight or less, to thereby improve the water resistance.

The adhesive composition can also contain a coupling agent such as a silane coupling agent or a titanium coupling agent, various kinds of tackifiers, a UV absorber, an antioxidant, and a stabilizer such as a heat-resistant stabilizer or a hydrolysis-resistant stabilizer.

The above-mentioned adhesive layer is typically formed by applying the above-mentioned adhesive composition and then bonding the polarizer and the polarizer protective film with the adhesive composition, followed by drying. The method of applying the adhesive composition includes a roll method, a spray method, and an immersion method. The temperature of the drying is typically 5 to 150° C., or preferably 30 to 120° C. The time of the drying is typically 120 seconds or more, or preferably 300 seconds or more. The adhesive layer formed from the above-mentioned adhesive composition has a thickness (thickness after drying) of preferably 0.01 to 10 µm, or more preferably 0.03 to 5 µm, because too large thickness is not preferred from the viewpoint of the adhesion property of the polarizer protective film.

B-3. Others

Examples of the above-mentioned film for providing different functional properties include a cycloolefin-based film, a polyimide-based film, a polyolefin-based film, and a triacetyl cellulose film. The film for providing different functional properties has a thickness of preferably 20 to 100 µm, or more preferably 30 to 80 µm. If the thickness is smaller than 20 µm, film strength may lower, resulting in inferior workability. If the thickness is larger than 100 µm, light transmittance may remarkably lower.

Any appropriate pressure-sensitive adhesive can be used as the pressure-sensitive adhesive forming the pressure-sensitive adhesive layer. Examples of the pressure-sensitive adhesive include a pressure-sensitive adhesive containing as a base polymer an acrylic polymer, a silicone-based polymer, polyester, polyurethane, polyamide, polyether, or a fluorine- or rubber-based polymer. A pressure-sensitive adhesive such as an acrylic pressure-sensitive adhesive is preferably used, which is excellent in optical transparency, exhibits appropriate pressure-sensitive adhesion properties (wettability, cohesive property, and adhesion property), and is excellent in weather resistance, heat resistance, and the like. An acrylic pressure-sensitive adhesive containing an acrylic polymer having 4 to 12 carbon atoms is particularly preferably used.

In addition to the above, in terms of the prevention of a foaming phenomenon and a peeling phenomenon caused by moisture absorption, the prevention of a degradation in optical properties and bending of a liquid crystal cell caused by thermal expansion difference or the like, and the formation property of a liquid crystal display apparatus which is of high quality and has excellent durability, a pressure-sensitive adhesive layer having a low moisture absorbing ratio and excellent heat resistance is preferred.

The pressure-sensitive adhesive layer can contain additives. Examples of the additives include: resins of a natural substance or a synthetic substance (in particular, tackifying resins); and a filler formed of glass fibers, glass beads, metal powder, other inorganic powders, or the like, a pigment, a colorant, and an antioxidant. Further, a pressure-sensitive adhesive layer that contains fine particles and exhibits light diffusion property may be used.

Any suitable method can be adopted as a method of forming the above-mentioned pressure-sensitive adhesive layer. Examples of the method include a system in which a pressure-sensitive adhesive solution obtained by dissolving or dispersing the above-mentioned base polymer, additives, and the like in a solvent is directly applied onto a polarizing plate or an optical member by using any suitable developing system (such as a flow casting system or an application system), and a system in which a pressure-sensitive adhesive layer is separately formed from the above-mentioned pressure-sensitive adhesive solution on a separator, and the pressure-sensitive adhesive layer is transferred from the separator onto a polarizing plate or an optical member. Specific examples of the solvent include a single solvent or mixed solvent of toluene, ethyl acetate, and the like. The concentration of the base polymer in the above-mentioned pressure-sensitive adhesive solution is typically 10 to 40 wt %.

The above-mentioned pressure-sensitive adhesive layer may be a superimposed layer which is formed of layers each having different compositions. Meanwhile, when pressure-sensitive adhesive layers are disposed on both sides of a polarizing plate, the respective pressure-sensitive adhesive layers may have different compositions, configurations, thicknesses, and the like. The thickness of the pressure-sensitive adhesive layer can be set at any appropriate value in accordance with the use purpose and the adhesive strength. The thickness is preferably 1 to 40 µm, more preferably 5 to 30 µm, and particularly preferably 10 to 25 µm. If the thickness of the pressure-sensitive adhesive layer is smaller than 1 µm, durability of the layer may degrade. If the thickness of the pressure-sensitive adhesive layer is larger than 40 µm, lifting and peeling are apt to occur due to foaming or the like, possibly resulting in an unsatisfactory external appearance.

In the present invention, each layer of the polarizer, the polarizer protective film, the adhesive layer, and the pressure-sensitive adhesive layer, and the like forming the polarizing plate can be provided with a UV-absorbing ability. The UV-absorbing ability is, for example, provided by the treatment with a UV absorber such as a salicylate-based compound, a benzophenol-based compound, a benzotriazole-based compound, a cyanoacrylate-based compound, and a nickel complex salt-based compound.

C. Image Display Apparatus

The image display apparatus of the present invention has the polarizing plate of the present invention. Specific examples of the image display apparatus include a self-emitting display apparatus such as an electroluminescence (EL) display, a plasma display (PD), or a field emission display (FED), and a liquid crystal display apparatus. The liquid crystal display apparatus has a liquid crystal cell and the polarizing plate of the present invention disposed on at least one side of the liquid crystal cell. When the polarizing plate of the present invention is disposed on one side of the liquid crystal cell, the polarizing plate may be disposed on the viewer side of the liquid crystal cell, or may be disposed on the backlight side of the liquid crystal cell.

EXAMPLES

Hereinafter, the present invention is described specifically with reference to examples, but the present invention is not limited to the examples. It should be noted that "parts" and "%" in the examples refer to "parts by weight" and "wt %", respectively, unless otherwise noted. Evaluations were performed as follows.

<Glass Transition Temperature>

A differential scanning calorimeter (DSC6220, manufactured by Seiko Instruments Inc.) was used in accordance with JIS K7121. Temperature was raised by 20° C./min in the temperature range of 25 to 300° C., followed by plotting a DSC curve, from which an extrapolation glass transition initiating temperature was obtained. The resultant temperature was defined as a glass transition temperature.

<Retardation>

An automatic birefringence measuring device "KOBRA-21ADH" manufactured by Oji Scientific Instruments was used to measure an in-plane retardation Δnd and a thickness direction retardation Rth.

<Haze>

"HAZEMETER HM-150" manufactured by Murakami Color Research Laboratory Co., Ltd. was used in accordance with JIS-K6714 to perform measurement.

<Adhesion Property Between Polarizer Protective Film and Polarizer>

The state in which a polarizing plate (100 mm×100 mm) was twisted and wrenched off with the hand was evaluated based on the following criteria.

○: The polarizer and the polarizer protective film are integrated with each other and do not peel from each other.

Δ: On an edge of the polarizing plate, peeling is recognized between the polarizer and the polarizer protective film.

x: In the entire polarizing plate, peeling is recognized between the polarizer and the polarizer protective film.

<Resistance to Moist Heat>

A polarizing plate (100 mm×100 mm) was left to stand for 500 hours in a high-temperature, high-humidity tank (under an environment of 60° C. and 95 RH %). The polarizing plate was then taken out and left to stand at room temperature for 12 hours. After that, the adhesion property between the polarizer protective film and the polarizer in the same manner as that described above.

Example 1

Preparation of Aqueous (Meth)Acrylic Resin Dispersion 400 parts of ion-exchanged water were loaded into a flask equipped with a dripping funnel, a stirrer, a nitrogen gas-introducing tube, a thermometer, and a reflux condenser. The temperature of the ion-exchanged water was raised to 70° C. under stirring while a nitrogen gas was blown gently. 5% of a pre-emulsion containing the monomers described below was added into the flask, followed by nitrogen substitution to a sufficient extent. After that, 0.8 part of a 5% potassium persulfate aqueous solution was added to start polymerization. The inside of the reaction system was kept at 70° C. for 10 minutes, and the remaining pre-emulsion and 7.2 parts of a 5% potassium persulfate aqueous solution were uniformly dripped over 180 minutes. The inside of the reaction system was kept at 70° C. during the dripping. Further, the mixture was aged under stirring at 70° C. for 60 minutes after termination of the dripping to terminate the polymerization. After that, the inside of the reaction system was cooled, and 25% ammonia water serving as a neutralizer was added at 60° C. or less until the pH of the reaction system becomes 7.6, to thereby prepare an aqueous (meth)acrylic resin dispersion (resin solid content of 18.9%).

[Monomers Contained in Pre-Emulsion]
Methyl methacrylate: 50 parts
Styrene: 10 parts
Cyclohexyl methacrylate: 17 parts
Methoxy polyethylene glycol methacrylate (average molecular weight of 496): 22 parts
Acrylic acid: 1 part (Production of Polarizer Protective Film)

There was provided into a biaxial extruder a pellet of a mixture (Tg of 123° C.) of 90 parts by weight of a (meth) acrylic resin {copolymerization monomer weight ratio=methyl methacrylate/methyl 2-(hydroxymethyl)acrylate=8/2; lactone ring formation percentage of about 100%} having a lactone ring structure represented by the following general formula (I), where $R^1$ represents a hydrogen atom and $R^2$ and $R^3$ each represent a methyl group, and 10 parts by weight of an acrylonitrile-styrene (AS) resin {TOYO AS AS20, manufactured by TOYO STYRENE Co., Ltd.}. The mixture was subjected to melt extrusion at about 280° C. to form a sheet shape. As a result, a sheet having a thickness of 110 μm and being formed from methyl methacrylate containing a lactone ring was obtained. The unstretched sheet was heated to 160° C. and stretched by 2.2 times in the longitudinal direction, to thereby obtain a uniaxially-stretched film.

[Chem 1]

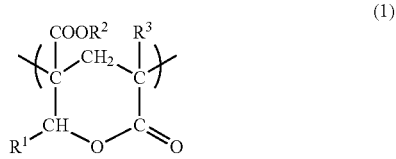

(1)

Next, the above-mentioned aqueous (meth)acrylic resin dispersion was applied onto one-side surface of the film by a reverse roll method so that the resultant layer has a thickness of 700 nm after being dried. After that, the resultant film was stretched with a tenter stretcher at 150° C. by 2.4 times in the width direction. Thus, obtained was a biaxially-stretched film which has an easy-adhesion layer having a thickness of 300 nm and having a glass transition temperature (Tg) of 48° C. on one-side surface of a (meth) acrylic resin film having a thickness of 40 μm.

(Production of Polarizer)

A polyvinyl alcohol film having a thickness of 80 μm was dyed in an aqueous solution containing 5 wt % of iodine (weight ratio: iodine/potassium iodide=1/10). Next, the resultant polyvinyl alcohol film was immersed in an aqueous solution containing 3 wt % of boric acid and 2 wt % of potassium iodide. Further, the polyvinyl alcohol film was stretched by 5.5 times in an aqueous solution containing 4 wt % of boric acid and 3 wt % of potassium iodide, and thereafter, the polyvinyl alcohol film was immersed in an aqueous solution containing 5 wt % of potassium iodide. After that, the polyvinyl alcohol film was dried in an oven at 40° C. for 3 minutes to obtain a polarizer having a thickness of 30 μm.

(Preparation of Adhesive Composition)

An aqueous solution of a polyvinyl alcohol-based adhesive was prepared by adding an aqueous solution containing 20 parts by weight of methylol melamine with respect to 100 parts by weight of an acetoacetyl group-modified polyvinyl alcohol resin (acetylation degree: 13%) so as to be a concentration of 0.5 wt %.

(Production of Polarizing Plate)

The aqueous solution of a polyvinyl alcohol-based adhesive was applied onto both surfaces of the polarizer, and the polarizer protective film was attached to each surface, followed by drying at 70° C. for 10 minutes. Here, the attachment was performed so that the easy-adhesion layer of the polarizer protective film may be positioned on the polarizer side. The polarizing plate was thus obtained.

Example 2

Formation of Pressure-Sensitive Adhesive Layer

As a base polymer, a solution (solid content: 30%) containing an acrylic polymer having a weight average molecular weight of 2,000,000 formed of a copolymer of butyl acrylate:acrylic acid:2-hydroxyethyl acrylate=100:5:0.1 (weight ratio) was used. To the acrylic polymer solution, 4 parts of an isocyanate-based polyfunctional compound (trade name: COLONATE L, manufactured by Nippon Polyurethane Co., Ltd.), 0.5 part of an additive (KBM 403, manufactured by Shin-Etsu Chemical Co., Ltd.), and a solvent (ethyl acetate) for adjusting the viscosity were added with respect to 100 parts of a polymer solid content, to thereby prepare a pressure-sensitive adhesive solution (solid content: 12%).

The pressure-sensitive adhesive solution was applied onto a separator (polyethylene terephthalate film: DIA FOIL MRF38, manufactured by Mitsubishi Chemical Polyester Film Co., Ltd.) so that the thickness of the layer was 25 μm after drying, followed by drying in a hot-air circulation type oven, to thereby form a pressure-sensitive adhesive layer.

(Production of Pressure-Sensitive Adhesive Polarizing Plate)

The pressure-sensitive adhesive layer was attached on the polarizer protective film side of the polarizing plate obtained in Example 1 to thereby produce a pressure-sensitive adhesive polarizing plate.

Comparative Example 1

A polarizer protective film and a polarizing plate were produced in the same manner as that in Example 1 except that a polyester aqueous dispersion ("PESRESIN A-520" manufactured by Takamatsu Oil & Fat Co., Ltd.) was used in place of the aqueous (meth)acrylic resin dispersion during formation of an easy-adhesion layer. The resultant easy-adhesion layer had a glass transition temperature (Tg) of 40° C.

Table 1 shows the results of evaluation on the polarizing plate provided in each of the examples and the comparative example.

TABLE 1

| | | | Example 1 | Example 2 | Comparative Example 1 |
|---|---|---|---|---|---|
| Polarizer protective film | Retardation (nm) | Δnd | 0.4 | 0.4 | 0.5 |
| | | Rth | 1.0 | 1.0 | 1.0 |
| | Haze (%) | | 0.8 | 0.8 | 0.8 |
| Polarizing plate | Adhesion property | | ○ | ○ | Δ |
| | Resistance to moist heat | | ○ | ○ | x |

As evident from Table 1, Examples 1 and 2 were excellent not only in adhesion property but also in resistance to moist heat. On the other hand, Comparative Example 1 was inferior in adhesion property and in resistance to moist heat. This shows that the formation of an easy-adhesion layer from an aqueous (meth)acrylic resin dispersion results in excellent adhesion property between a polarizer and a polarizer protective film (in particular, under high temperature and high humidity conditions).

In addition, the polarizer protective films of Examples 1 and 2 were excellent in optical properties as well. This shows that the formation of an easy-adhesion layer from an aqueous (meth)acrylic resin dispersion results in excellent optical properties and excellent adhesion property.

INDUSTRIAL APPLICABILITY

The polarizer protective film and the polarizing plate of the present invention can be suitably used for image display apparatuses such as a liquid crystal display apparatus and a self-emitting display apparatus.

The invention claimed is:

1. A polarizing plate, comprising
a polarizer and
a polarizer protective film,
wherein the polarizer protective film is disposed on at least one side of the polarizer,
wherein the polarizer protective film comprises a (meth)acrylic resin film and an easy-adhesion layer disposed on at least one side of the (meth)acrylic resin film,
wherein the polarizer protective film comprises the easy-adhesion layer disposed on a side facing the polarizer,
wherein the easy-adhesion layer is formed from an aqueous (meth)acrylic resin dispersion,
wherein the easy-adhesion layer is formed by applying the aqueous (meth)acrylic resin dispersion onto the (meth)acrylic resin film to form an applied layer,
wherein a resultant (meth)acrylic resin film is formed by applying the aqueous (meth)acrylic resin dispersion onto the (meth)acrylic resin film so that the easy-adhesion layer is formed directly onto the (meth)acrylic resin film,
stretching the resultant (meth)acrylic resin film in at least a uniaxial direction while subjecting the resultant (meth)acrylic resin film to a heat treatment,
and
wherein the aqueous (meth)acrylic resin dispersion comprises at least one kind of water-soluble monomer selected from the group consisting of a polyalkylene glycol (meth)acrylate, (meth)acryloyl morpholine, and a hydroxyalkyl (meth)acrylamide.

2. The polarizing plate according to claim 1, wherein the easy-adhesion layer has a glass transition temperature of 20° C. or more.

3. The polarizing plate according to claim 1, wherein the (meth)acrylic resin film comprises a (meth)acrylic resin having a glass transition temperature of 100° C. or more.

4. The polarizing plate according to claim 3, wherein the polarizer protective film has an in-plane retardation Δnd of 1.0 nm or less, a thickness direction retardation Rth of 3.0 nm or less, and a haze of 1.0% or less.

5. The polarizing plate according to claim 1, further comprising a pressure-sensitive adhesive layer.

6. An image display apparatus, comprising the polarizing plate according to claim 1.

* * * * *